United States Patent
Fukui et al.

(10) Patent No.: US 9,860,567 B2
(45) Date of Patent: Jan. 2, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Toshiyuki Fukui, Yokohama (JP); Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 14/842,587

(22) Filed: Sep. 1, 2015

(65) Prior Publication Data

US 2016/0073109 A1  Mar. 10, 2016

(30) Foreign Application Priority Data

Sep. 5, 2014  (JP) ................. 2014-181343

(51) Int. Cl.
*H04N 7/12* (2006.01)
*H04N 19/85* (2014.01)
*G06T 5/00* (2006.01)

(52) U.S. Cl.
CPC ............ *H04N 19/85* (2014.11); *G06T 5/00* (2013.01)

(58) Field of Classification Search
CPC ................. H04N 19/85; G06T 5/00
See application file for complete search history.

(56) References Cited

U.S. PATENT DOCUMENTS

| 8,340,461 | B2 | 12/2012 | Sun et al. | |
| 2001/0012324 | A1* | 8/2001 | Normile | H04N 19/52 375/240.05 |
| 2012/0213281 | A1* | 8/2012 | Choi | H04N 19/52 375/240.16 |
| 2012/0243611 | A1* | 9/2012 | Kondo | H04N 19/117 375/240.16 |
| 2015/0085926 | A1* | 3/2015 | Komiya | H04N 19/597 375/240.12 |

FOREIGN PATENT DOCUMENTS

JP  2011-216965 A  10/2011

* cited by examiner

*Primary Examiner* — Tat Chio
(74) *Attorney, Agent, or Firm* — Canon USA, Inc. I.P. Division

(57) ABSTRACT

An image processing apparatus includes an image processing unit configured to generate a plurality of processed images by performing image processing on a plurality of input images, a determination unit configured to determine, as a reference image for encoding a processed image generated by the image processing on an input image, whether the input image corresponding to the processed image is to be used or another processed image is to be used, based on a parameter relating to the image processing, and an encoding unit configured to encode the processed image by referring to a reference image according to a determination by the determination unit.

11 Claims, 10 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to encoding of images.

Description of the Related Art

In recent years, cameras for monitoring in order for distribution of images via a network are widely used. Some of the cameras perform various types of image processing on an original image according to an intended purpose of use. For example, there is a case where image processing is performed on a main image input as a result of image capture by a camera to generate a sub-image so that, for example, a monitoring target becomes clearly visible, and recognition processing is facilitated.

To transmit both the main image and the sub-image from the camera or to accumulate the main image and the sub-image in the camera, moving image compression is performed. A well-known video coding format used for compression and recording of moving images is H.264/Moving Picture Experts Group-4 (MPEG-4) Advanced Video Coding (AVC) (hereinafter, "H.264"). Further, in recent years, the international standardization efforts were commenced for a more highly-efficient encoding format as a successor to H.264, and a Joint Collaborative Team on Video Coding (JCT-VC) was established by the International Organization for Standardization/International Electrotechnical Commission (ISO/IEC) and the Telecommunication Standardization Sector of the International Telecommunication Union (ITU-T). By JCT-VC, standardization of the High Efficiency Video Coding (hereinafter, "HEVC") is implemented.

For example, Japanese Patent Application Laid-Open No. 2011-216965 discusses a method in which a plurality of stream images is transmitted using a multiview coding (MVC) standard, which is an extension of H.264. Japanese Patent Application Laid-Open No. 2011-216965 discusses a technique in which a specific video stream among a plurality of video streams is encoded as a base stream and another video stream is encoded using an encoding method by which the video stream can be encoded by reference to the base stream. According to Japanese Patent Application Laid-Open No. 2011-216965, for example, a video stream corresponding to an image captured by a network camera is encoded as a base stream, and a video stream acquired by performing noise reduction on the captured image can be encoded using the encoding method in which the video stream can be encoded by reference to the base stream.

A defog/dehaze technique (U.S. Pat. No. 8,340,461) is well known as image processing for generating a sub-image (video stream encoded using the encoding method in which the video stream can be encoded by reference to the base stream).

However, there is a possibility that the amount of processing is increased in a case of encoding a plurality of images.

The amount of processing is likely to increase especially in a case of generating a sub-image (noise-reduced image) from a main image (captured image) and encoding each of the sub-image and the main image using the MVC standard. Specifically, if a plurality of images including the main image and other sub-images is to be referred to in order to adopt a reference image for encoding the sub-image with high encoding efficiency, the amount of processing is likely to increase because it is necessary to refer to a large amount of images.

SUMMARY OF THE INVENTION

According to an aspect of the present invention, an image processing apparatus includes an image processing unit configured to generate a plurality of processed images by performing image processing on a plurality of input images, a determination unit configured to determine, as a reference image for encoding a processed image generated by the image processing on an input image, whether the input image corresponding to the processed image is to be used or another processed image is to be used, based on a parameter relating to the image processing, and an encoding unit configured to encode the processed image by referring to a reference image according to a determination by the determination unit.

Further features of the present invention will become apparent from the following description of exemplary embodiments with reference to the attached drawings.

DESCRIPTION OF THE EMBODIMENTS

Various exemplary embodiments will be described in detail below with reference to the drawings.

According to a first exemplary embodiment of the present invention, noise correction processing, especially defog/dehaze processing, is performed as image processing on a main image (captured image) and both the main image and the processed image having being subjected to the defog/dehaze processing are encoded. The defog/dehaze processing includes analyzing the captured image to determine the fog/haze density of each area, estimating how light is scattered by the fog/haze based on the fog/haze density, and reducing the effect of the fog/haze by use of the estimation result. Details of the defog/dehaze processing are not limited to those described above, and the noise correction processing to be performed in the present exemplary embodiment is not limited to the defog/dehaze processing.

The present exemplary embodiment is described with reference to the drawings.

Figure 1:
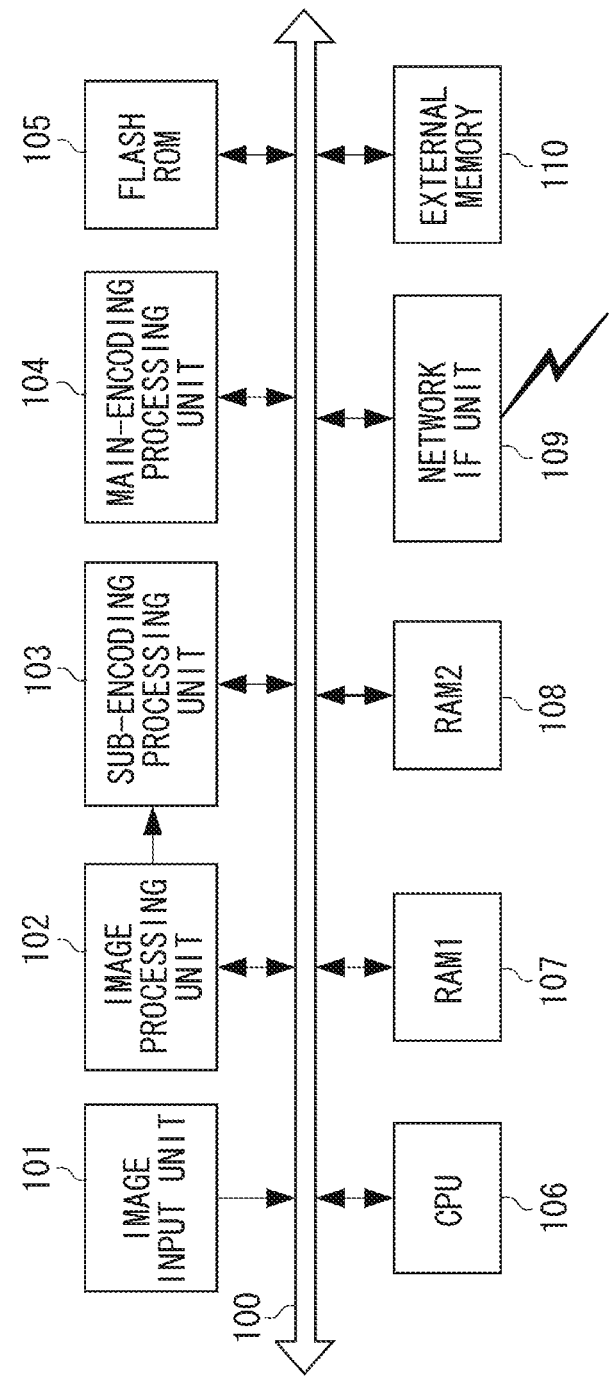
FIG. 1 is a block diagram illustrating a hardware configuration of an image processing apparatus according to an exemplary embodiment.

FIG. 1 is a block diagram illustrating a hardware configuration of an image processing apparatus according to the present exemplary embodiment. As illustrated in FIG. 1, the image processing apparatus according to the present exemplary embodiment includes a system bus 100, an image input unit 101, an image processing unit 102, a sub-encoding processing unit 103, a main encoding processing unit 104, and a flash read-only memory (flash ROM) 105. The image processing apparatus according to the present exemplary embodiment further includes a central processing unit (CPU) 106, a random access memory 1 (RAM1) 107, a RAM2 (108), a network interface (network IF) unit 109, and an external memory 110. The image processing apparatus according to the present exemplary embodiment can be realized by a digital camera, a digital video camera, a mobile phone, a smartphone, a tablet, a personal computer, a hard disk recorder, or any other various types of household appliances.

The image processing apparatus includes the system bus 100. Function blocks of the image processing apparatus are connected with each other via the system bus 100. In a case where the image processing apparatus includes an image capturing unit, the image input unit 101 corresponds to, for example, a camera lens and a sensor. Further, there may be a case where the image input unit 101 receives video signal inputs from an external device. In any case, temporally-continuous images are input from the image input unit 101. The input images are referred to as main images. The main images are transferred to the RAM1 (107) via the system bus 100. According to the present exemplary embodiment, the main images are images included in a moving image acquired by image capturing. However, this is not a limiting case. For example, captured images acquired by image capturing and having already being subjected to any kind of processing may be input as main images.

The image processing apparatus includes the image processing unit 102. The image processing unit 102 reads the main images from the RAM1 (107) and performs predetermined image processing on the main images to generate processed images. The generated processed images are written back to the RAM1 107 via the system bus 100. Specifically, the image processing unit 102 executes the image processing on each of the plurality of input images to generate a plurality of processed images. Further, the image processing unit 102 includes a function of outputting intermediate information during the image processing. According to the present exemplary embodiment, the intermediate information is passed to the sub-encoding processing unit 103 directly from the image processing unit 102. Details of the image processing unit 102 will be described below.

The image processing apparatus includes the sub-encoding processing unit 103. The sub-encoding processing unit 103 reads the processed images generated by the image processing unit 102 from the RAM1 (107) and performs encoding processing according to a predetermined format to generate encoded data. The encoded data is outputted to the RAM1 (107) via the system bus 100. At the time of the encoding of the processed images, the sub-encoding processing unit 103 refers to the intermediate information passed from the image processing unit 102 to determine a reference image to be used in the encoding. Details of the sub-encoding processing unit 103 will be described below.

The image processing apparatus includes the main encoding processing unit 104. The main encoding processing unit 104 reads the main images acquired by the image input unit 101 from the RAM1 (107) and performs encoding processing on the main images according to a predetermined format. The encoded data is outputted to the RAM1 (107) via the system bus 100.

According to the present exemplary embodiment, the multiview coding (MVC) standard, which is an extension of H.264, is used as a moving image encoding processing method. The encoding method, however, is not limited to the MVC standard, and the HEVC standard or the Scalable Video Coding (SVC) standard may also be used.

The image processing apparatus includes the flash ROM 105. The flash ROM 105 stores a program for activating the CPU 106 configured to control the entire system, parameter information required for image processing, compression processing, and the like.

The image processing apparatus includes the CPU 106. The CPU 106 controls the image processing apparatus. The CPU 106 is connected via the system bus 100 to the flash ROM 105 where the control program is stored and the RAM1 (107) which is also used as a work area for the processing performed by the CPU 106.

The image processing apparatus includes the RAM1 (107). The RAM1 (107) is a RAM to be used for storing input main images and processed images generated from the main images by image processing on the main images. The RAM1 (107) is also used as a work area of the CPU 106.

The image processing apparatus includes the RAM2 (108). The RAM2 (108) is a RAM for storing reference images output from the main encoding processing unit 104 or the sub-encoding processing unit 103.

According to the present exemplary embodiment, the RAM1 (107) and the RAM2 (108) are described as separate RAMs, the RAM1 (107) and the RAM2 (108) may be provided as a single RAM. The configuration is not limited by the present exemplary embodiment.

The image processing apparatus includes the network IF unit 109. The encoded main images and the encoded processed images may be transmitted to an external device on an external network via the network IF unit 109.

The image processing apparatus includes the external memory 110. The external memory 110 is an external memory device, typical examples including a hard disk, a memory card, or the like. The encoded main images and the encoded processed images may be stored in the external memory 110 and read by an external device as necessary via the network IF unit 109.

Figure 2:
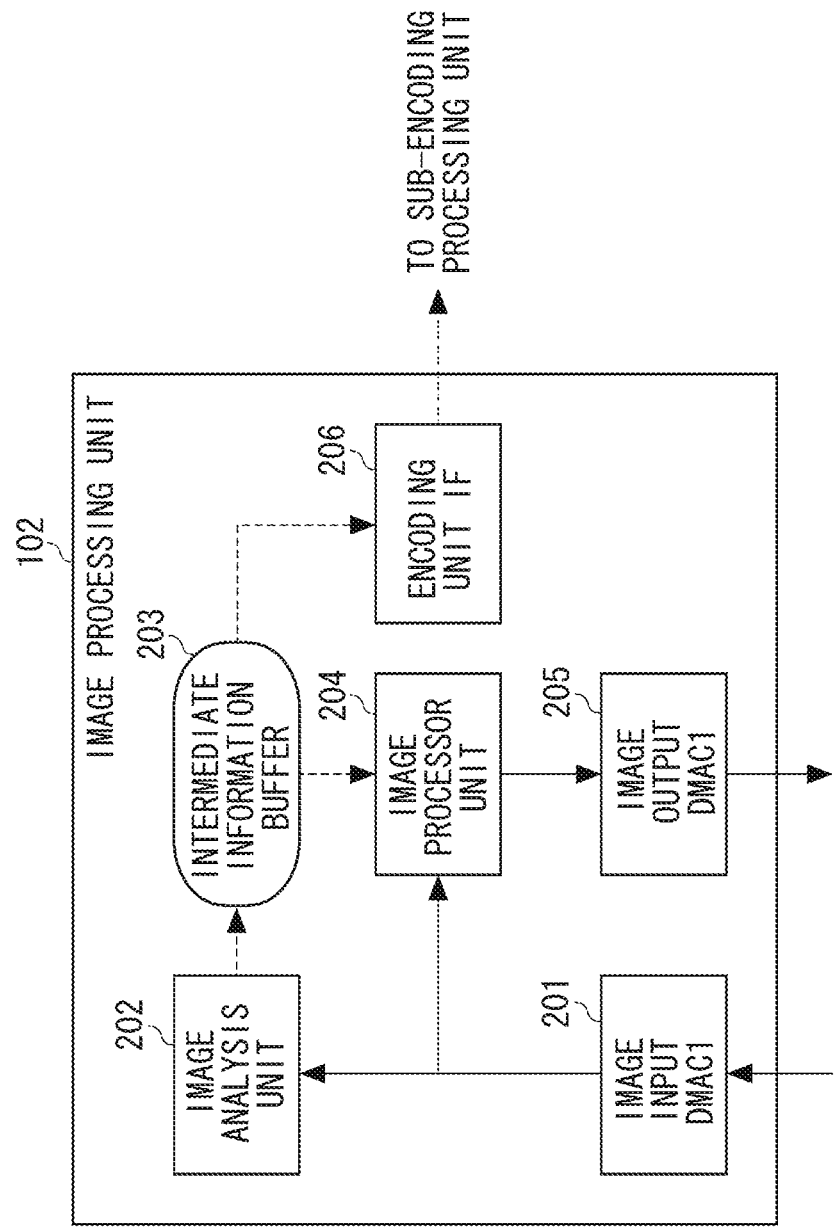
FIG. 2 illustrates a configuration of an image processing unit according to an exemplary embodiment.

FIG. 2 illustrates an example of a configuration of the image processing unit 102 according to the present exemplary embodiment. As illustrated in FIG. 2, the image processing unit 102 includes an image input DMAC1 (201), an image analysis unit 202, an intermediate information buffer 203, an image processor unit 204, an image output DMAC1 (205), and an encoding unit IF 206. According to the present exemplary embodiment, the image processing is defog/dehaze processing. The defog/dehaze processing is one of the various types of image processing for noise reduction.

In the configuration example illustrated in FIG. 2, a main image (captured image) is loaded as an original image from the RAM1 (107) by the image input DMAC1 via the system bus 100. In FIG. 2, real lines indicate a flow of the main image and a processed image acquired by processing the main image, and dotted lines indicate a flow of data relating to fog density map information which is intermediate information described below.

Figure 4A:
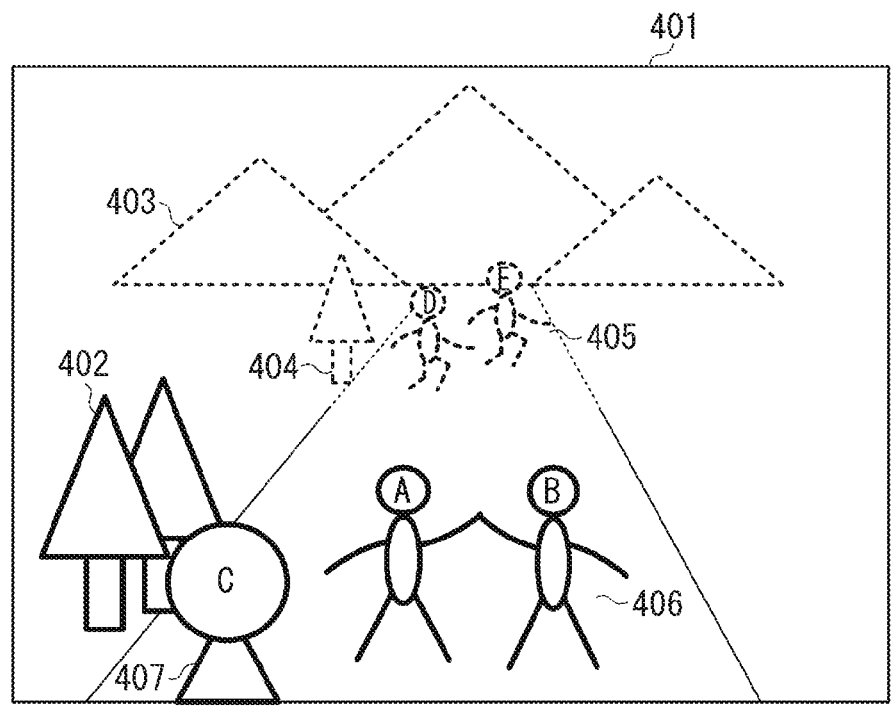
FIGS. 4A and 4B each illustrate examples for details of image processing according to an exemplary embodiment.

An example of the loaded main image is illustrated in FIG. 4A. An entire viewing angle 401 of the captured image is illustrated. In FIG. 4A, human objects A, B (406), and C (407) and trees (402) are specified by real lines, which indicates that they are clearly visible on the image. On the other hand, human objects D and E (405), a tree 404, and background mountains 403 are specified by dotted lines, which indicates that they appear hazy due to haze.

The main image input by the image input DMAC1 (201) is passed to the image analysis unit 202. The image analysis unit 202 estimates the fog density of each area of the loaded main image. Examples of a fog density estimation method include a method using luminance information, a method using a haze scatter model in the atmosphere, a method in which an image is compared to an image of the same time and same viewing angle in which no haze occurs, a method using information on colors within a screen, and the like.

For example, in the case of estimating the fog density by use of luminance information, an area which has a higher luminance than a threshold value and is wider than a predetermined area can be determined as an area having a high fog density, and other areas can be determined as an area having a low fog density or an area having no fog. If multiple threshold values for luminance are set, the fog density level can be determined more precisely. Further, the fog density can also be determined based on a change in luminance within the main image. Further, an image of the same viewing angle in which no haze occurs and/or color information can also be used in addition to the luminance information.

In the case where the image processing is the noise correction processing, the image analysis unit 202 determines the intensity of noise in the image. According to the present exemplary embodiment, the defog/dehaze processing is performed as the noise correction processing. In this case, the image analysis unit 202 outputs a result of estimation (determination) of the fog density of each pixel on the image in the form of an image (hereinafter, "fog density map") indicating the fog/haze density distribution, which is intermediate information, and stores the fog density map in the intermediate information buffer 203. Instead of estimating the fog density (noise intensity) of each pixel, the fog density (noise intensity) may be estimated for each block or any other arbitrary area. Specifically, the image analysis unit 202 determines the noise intensity of each area of the main image corresponding to the processed image and stores the determined noise intensities in the intermediate information buffer 203.

Figure 5A:
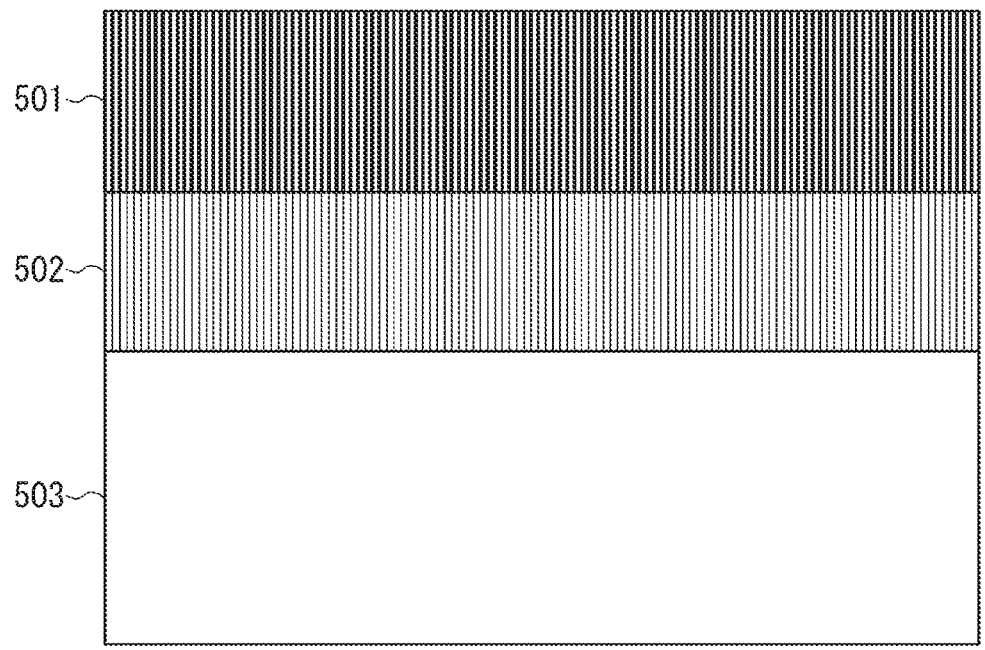
FIGS. 5A and 5B illustrate examples of intermediate information acquired during a process of image processing according to an exemplary embodiment.
Figure 5B:
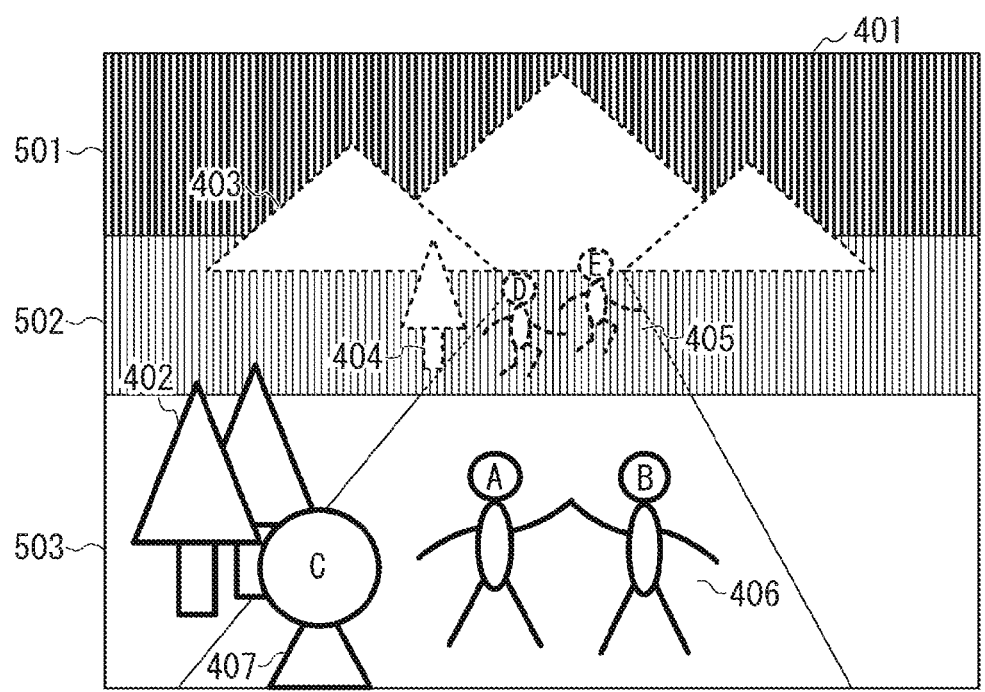

An example of the fog density map is illustrated in FIG. 5A. In FIGS. 5A and 5B, the screen is divided into three sections, an area 501 with dark vertical lines, an area 502 with pale vertical lines, and an area 503 with no vertical line. The area with darker vertical lines is determined as having high fog density. In the case of FIG. 5A, the area 501 has the highest fog density, and the area 503 receives practically no effect of fog. According to the present exemplary embodiment, the fog density is divided into three levels. However, a fog density map may be generated in which the fog density changes in a more number of levels.

In FIG. 5B, the objects illustrated in FIG. 4A are arranged on the fog density map illustrated in FIG. 5A so that the relationship between the fog density distribution and how the objects appear in the main image is illustrated. It can be understood that the objects that appear hazy in FIG. 4A due to the effect of fog exist in the areas 501 and 502 in FIG. 5A.

The image processor unit 204 of the image processing unit 102 performs the defog/dehaze processing on the main image using the fog density map stored in the intermediate information buffer 203. The image processor unit 204 refers to the information of the fog density map to identify the fog density of each area of the main image so that the image processor unit 204 can perform the defog/dehaze processing commensurate with the fog density. More specifically, the image processor unit 204 can estimate how light is scattered by the fog in each area of the main image and perform the processing to reduce the effect of fog. Specifically, the image processor unit 204 according to the present exemplary embodiment executes, as the image processing, the noise reduction processing commensurate with the noise intensity of each area of the input image (main image).

Figure 4B:
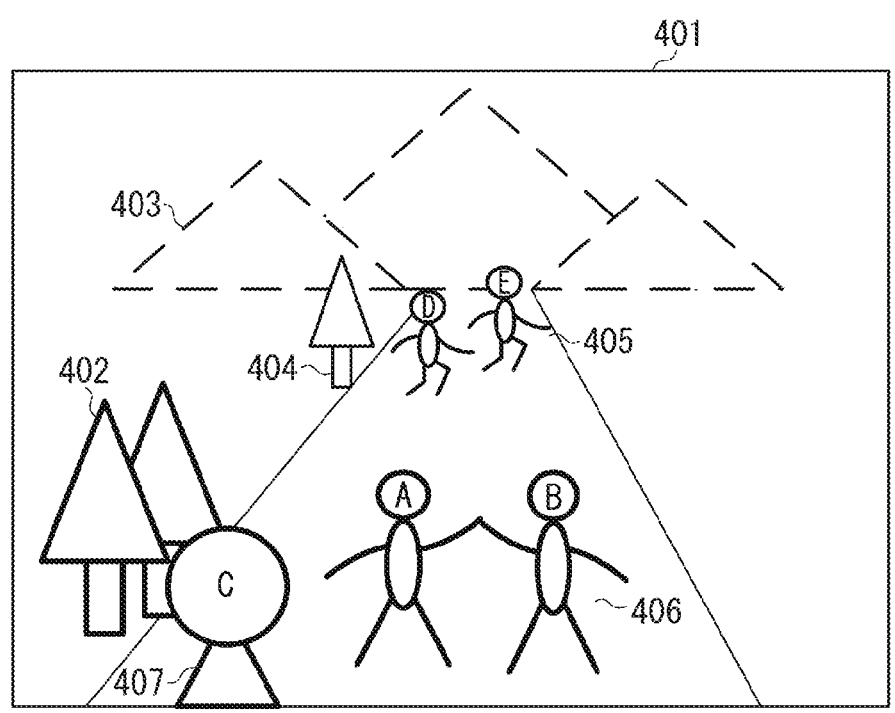

FIG. 4B illustrates an example of the processed image. In FIG. 4B, in addition to the human objects A, B (406), and C (407) and the trees (402), which are specified in real lines in FIG. 4A, the human objects D and E (405) and the tree 404 are specified in real lines. That is, FIG. 4B indicates that the effect of fog on the human objects D and E (405) and the tree 404 is decreased so that the human objects D and E (405) and the tree 404 become clearly visible. Further, the dotted lines specifying the background mountains 403 in FIG. 4B are changed from the finely-dotted line in FIG. 4A to a roughly-dotted line. This indicates that the mountains 403 become more clearly visible than in FIG. 4A as a result of the decrease in the effect of fog but the image is not improved to an extent that the mountains 403 is clearly visible enough to be specified in real lines.

The processed image generated by the image processor unit 204 as described above is outputted to the RAM1 (107) by the image output DMAC1 (205) via the system bus 100 and stored in the RAM1 (107).

The fog density map stored in the intermediate information buffer 203 is transmitted to the sub-encoding processing unit 103 via the encoding unit IF 206. How the data of the fog density map is used as the intermediate information (parameter relating to image processing) in the sub-encoding processing unit 103 will be described below.

Operations of the main encoding processing unit 104 and the sub-encoding processing unit 103 is described below. According to the present exemplary embodiment, the MVC standard, which is an extension of H.264, is used as the moving image encoding processing method. The main encoding processing unit 104 encodes base views, and the sub-encoding processing unit 103 encodes non-base views.

Figure 6:
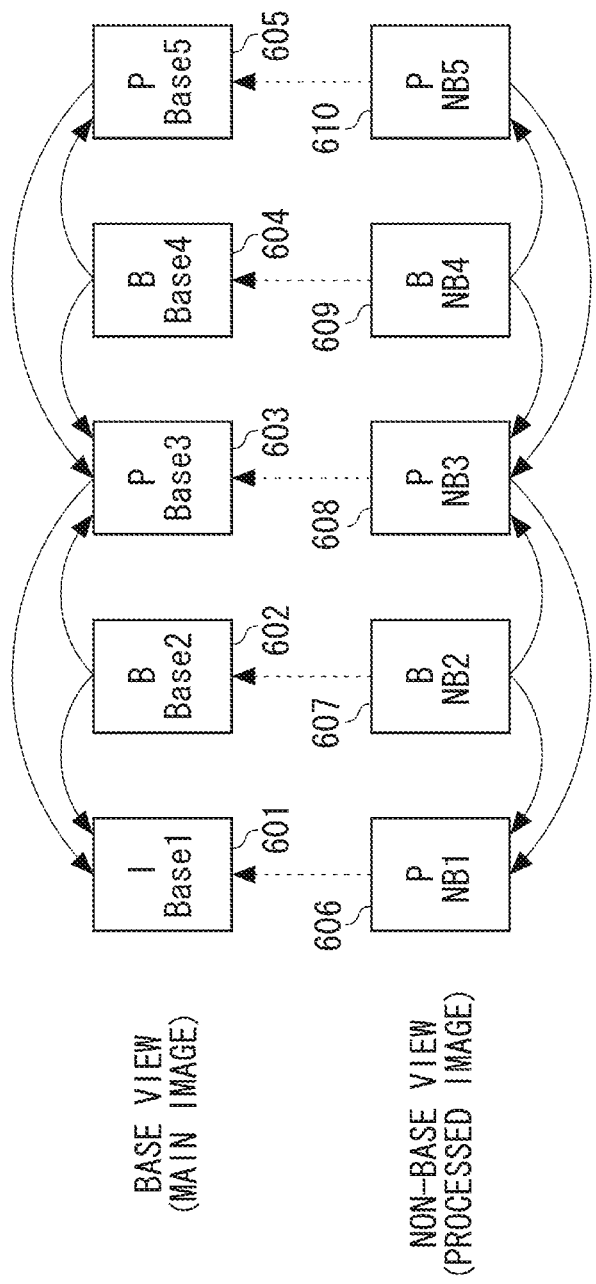
FIG. 6 illustrates a reference relationship between a base view and a non-base view at the time of encoding according to an exemplary embodiment.

FIG. 6 schematically illustrates the reference relationship between the base views and the non-base views in the encoding. The following discusses a case of generating an image of three formats, I-frame, P-frame, and B-frame. Base1 (601), which is the first page of the main image, is encoded as an I-frame. In this case, no reference image exists, and the Base1 (601) is encoded using only information of the input image. Then, Base3 (603), which is the third page of the main image, is encoded as a P-frame by reference to the Base1 (601). The reference relationship is specified by arrows illustrated in FIG. 6. An arrow from the Base3 (603) to the Base1 (601) indicates the reference relationship between the two images. Further, Base2 (602), which is the second page of the base view, is encoded as a B-frame by reference to both the Base1 (601) and the Base3 (603). An arrow from the Base2 (602) to the Base1 (601) and an arrow from the Base2 (602) to the Base3 (603) indicate the reference relationship. The foregoing also applies to Base4 (604), which is the fourth page of the base view, and Base5 (605), which is the fifth page of the base view.

In the encoding of the non-base view, there are two cases where a base view of the same time is referred to as the reference image and where a non-base view image of a previous or subsequent time is referred to as the reference image. In FIG. 6, for example, a dotted-line arrow from NB3 (608) of the non-base view to the Base3 (603) indicates the reference to the base view of the same time. On the other hand, an arrow from the NB3 (608) of the non-base view to NB1 (606) of the non-base view indicates the reference relationship between the non-base views. The foregoing also applies to other arrows.

According to the present exemplary embodiment, the reference relationship of the non-base views is uniquely determined by the fog density map as the intermediate information (parameter relating to image processing) described above, and the encoding of the non-base views is performed. How the encoding is performed is described below with reference to FIGS. 1, 3, 4A, 4B, 5A, 5B, 6, and 7.

A main image input from the image input unit 101 at a time t will be referred to as a main image $V_t$. Further, a processed image acquired by performing image processing on the main image $V_t$ in the image processing unit 102 will be referred to as a processed image $V'_t$. In FIGS. 4A and 4B, the main image $V_t$ corresponds to the example illustrated in FIG. 4A, and the processed image $V'_t$ corresponds to the example illustrated in FIG. 4B.

In FIG. 1, the main encoding processing unit 104 receives the main image $V_t$ stored in the RAM1 (107) via the system bus 100 and encodes the main image $V_t$ as a base view. The encoded main image is written to the RAM1 (107). Further, the main encoding processing unit 104 stores a locally-encoded image to be used in the encoding of the base view as the reference image in the RAM2 (108) and reads and uses the stored image as necessary.

When the encoding of the main image $V_t$ as a base view is completed, the encoding of the processed image $V'_t$ as a non-base view is performed.

Figure 3:
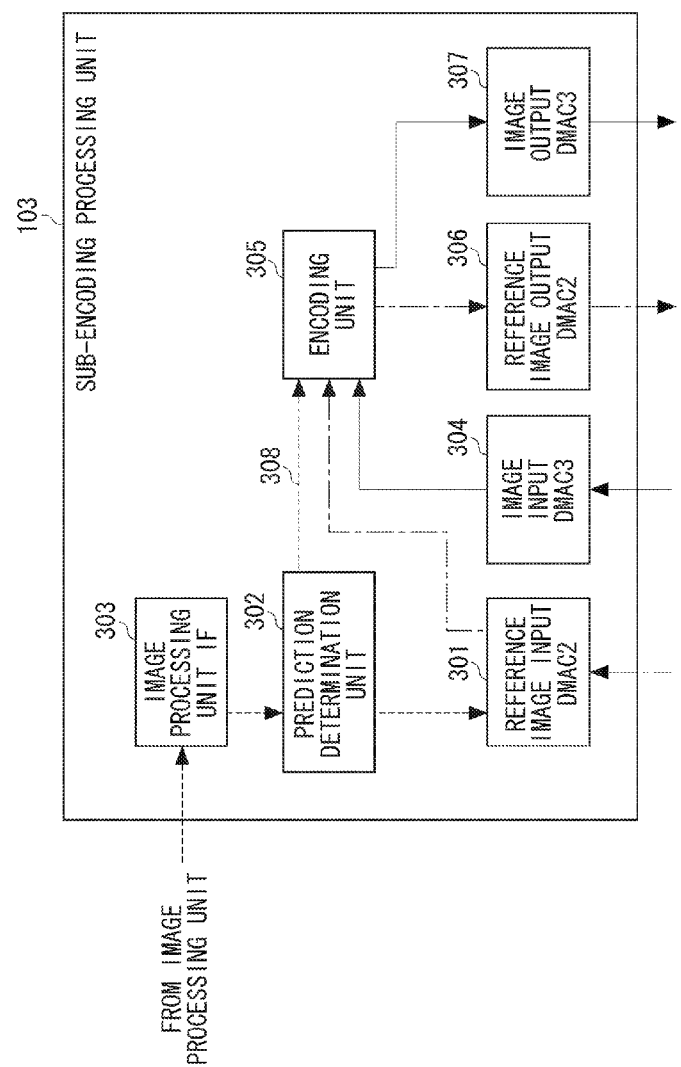
FIG. 3 illustrates a configuration of a sub-encoding processing unit according to an exemplary embodiment.

In FIG. 3, the sub-encoding processing unit 103 receives from an image input DMAC3 (304) the data of the processed image $V'_t$ to be encoded, via the system bus 100 from the RAM1 (107). Further, the sub-encoding processing unit 103 receives the fog density map information from the image processing unit 102 via an image processing unit IF 303. Then, the sub-encoding processing unit 103 determines, using a prediction determination unit 302, whether an area to be encoded should be encoded by reference to the base view of the same time or by reference to the previous or subsequent non-base view. In FIG. 3, dotted lines indicate a flow of data relating to the fog density map information, and dashed-dotted lines indicate a flow of data relating to the reference image. Further, real lines indicate a flow of the processed image $V'_t$ and the encoded processed image $V'_t$.

Figure 7:
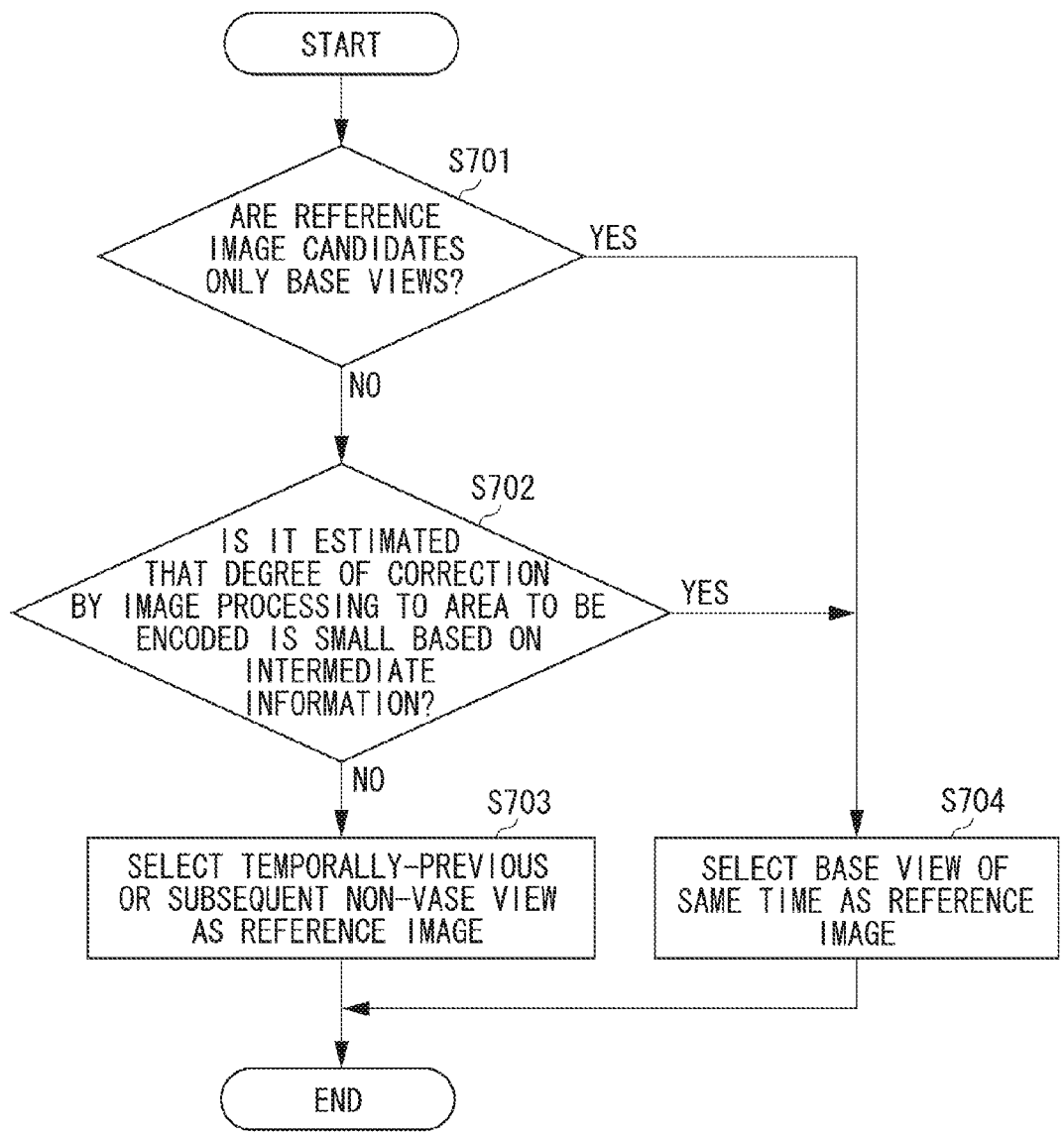
FIG. 7 is a flow chart illustrating operations of a prediction determination unit according to an exemplary embodiment.

FIG. 7 is a flow chart illustrating operations of the prediction determination unit 302 of the sub-encoding processing unit 103. For example, the process illustrated in FIG. 7 is started concurrently with the start of the encoding processing in response to a user operation. Prior to or in parallel with the process illustrated in FIG. 7, the following process is executed by the CPU 106 of the image processing apparatus. Specifically, the CPU 106 executes the steps corresponding to the input of an image (main image) by the image input unit 101, the identification of a parameter relating to the image processing to be performed on each area of the main image, and the generation of a processed image by performing the image processing commensurate with the identified parameter.

Further, according to the present exemplary embodiment, an image is encoded according to the MVC standard. Specifically, the image processing apparatus according to the present exemplary embodiment encodes an input image as a main image and encodes a processed image as a sub-image.

In step S701, the prediction determination unit 302 determines whether reference image candidates corresponding to a processed image to be encoded are only base views. If a processed image of frame 1 of the moving image is to be encoded, the prediction determination unit 302 determines that the reference image candidates are only base views. The foregoing case of frame 1 is not a limiting case. For example, in response to a special user instruction, a setting that only the I-frame of the base views is periodically selected as the reference image may be configured. In a case where the prediction determination unit 302 determines that the reference image candidates are only base views (YES in step S701), the processing proceeds to step S704. In step S704, the base view of the same time is selected as the reference image, and the prediction determination unit 302 issues an instruction, for example, to set an address of the base view of the same time to a reference image input DMAC2 (301).

In response to the instruction, the reference image input DMAC2 (301) reads from the RAM2 the main image of the same time (base view image) as the processed image to be encoded and passes the read main image to an encoding unit 305. Then, the encoding unit 305 refers to the base view image passed from the reference image input DMAC2 (301) and executes encoding of the processed image to be encoded. Specifically, the encoding unit 305 calculates a difference between the image (main image or processed image) determined by the prediction determination unit 302 and the processed image to be encoded and encodes the difference data to encode the processed image to be encoded. Depending on the difference calculation result, intra-frame encoding may be performed.

On the other hand, in step S701, in a case where the prediction determination unit 302 determines that the reference image candidates are not only base views (NO in step S701), the processing proceeds to step S702. In step S702, the prediction determination unit 302 determines a parameter (noise intensity) relating to the image processing corresponding to the area to be encoded based on the intermediate information acquired via the image processing unit IF 303. In other words, the prediction determination unit 302 predicts a degree of correction by the image processing based on the parameter relating to the image processing which was acquired by the image analysis performed by the image analysis unit 202.

In a case where the prediction determination unit 302 predicts that the degree of correction is small (YES in step S702), the processing proceeds to step S704. In step S704, the base view of the same time is selected as the reference image. On the other hand, In a case where the prediction determination unit 302 predicts that the degree of correction is large (NO in step S702), the processing proceeds to step S703. In step S703, a temporally-previous or subsequent non-base view is selected as the reference image.

Specifically, the prediction determination unit 302 according to the present exemplary embodiment determines the reference image for encoding the processed image (non-base view image) generated by the image processing on the input image (main image) based on the parameter relating to the image processing. More specifically, in a case where it is predicted that the degree of correction by the image processing is small based on the parameter relating to the image processing, the main image corresponding to the processed image is determined as the reference image. On the other hand, in a case where it is predicted that the degree of correction by the image processing is large based on the parameter relating to the image processing, another non-base view image which is temporally previous or subsequent to the processed image is determined as the reference image.

However, the method is not limited to the method in which the degree of correction is predicted. For example, the reference image may be determined based on whether the parameter (noise intensity) relating to the image processing is equal to or higher than a threshold value. In this case, the prediction determination unit 302 determines the reference image using information on the noise intensity of each area of the input image (main image) corresponding to the processed image to be encoded. More specifically, with respect to an area having a lower noise intensity value than the threshold value, the prediction determination unit 302 causes the encoding unit 305 to execute the encoding using the main image corresponding to the processed image to be encoded as the reference image. On the other hand, with respect to an area having a noise intensity value equal to or higher than the threshold value, the prediction determination unit 302 causes the encoding unit 305 to execute the encoding using another processed image (non-base view image) which is temporally previous or subsequent to the processed image to be encoded as the reference image. According to the present exemplary embodiment, the image processing is the defog/dehaze processing, and the intermediate information (parameter relating to the image processing) is the fog density map.

For example, as to an area with a low fog density such as the area 503 illustrated in FIG. 5, the intensity (degree) of correction by the defog/dehaze processing is small because no correction is required. In FIGS. 4A and 4B, the human objects A, B (406), and C (407) and the trees (402) appear practically the same. In such an area, the difference between the main image $V_t$, which is the base view, and the processed image $V'_t$, which is the non-base view, is significantly small. Thus, the prediction determination unit 302 determines the base view image as the reference image.

On the other hand, as to an area with a high fog density such as the areas 501 and 502 illustrated in FIG. 5, how the objects appear is changed by the correction because the effect of correction by the defog/dehaze processing is large. In FIG. 4, how the human objects D and E (405) and the tree (404) and the background mountains 403 appear is significantly different between the main image A and the processed image B. In such an area, it is predicted that the difference between the main image $V_t$, which is the main view, and the processed image $V'_t$, which is the non-base view, is great and the difference between the temporally-previous and subsequent non-base views $V'_{t-1}$ and $V'_{t+1}$ is small. Thus, the prediction determination unit 302 determines, as the reference image, the non-base view (processed image) which is temporally previous or subsequent to the processed image to be encoded.

According to the present exemplary embodiment, the intensity (degree) of correction can be identified based on the fog density. Suppose that, for example, the fog density of the area 502 illustrated in FIG. 5A is set as the threshold value as in the example described above. In this case, as to the areas 501 and 502 with high fog density, the prediction determination unit 302 predicts that the intensity of correction is large (NO in step S702). Thus, in step S703, the non-base view which is temporally previous or subsequent to the processed image to be encoded is determined as the reference image. On the other hand, as to an area corresponding to the area 503 with low fog density, the prediction determination unit 302 predicts that the intensity of correction is small (YES in step S702), and in step S704, the base view (main image of the same time) is determined as the reference image.

In general, the encoding is performed on each macroblock (divided area) unit such as 16×16 pixels. The prediction determination unit 302 according to the present exemplary embodiment determines the reference image for each macro block unit. Since the fog density gradually changes, the prediction determination unit 302 uses an average value, a median value, a mode value, and the like of the fog density in each pixel within the macroblock (within the divided area) in the determination of the degree of correction. This, however, is not a limiting configuration, and the reference image may be determined for each pixel unit or a larger range than the macroblock.

The prediction determination unit 302 issues an instruction, for example, to set an address corresponding to the reference to the reference image input DMAC2 (301) whereby the foregoing determination of the reference image for each area is realized. Data for reference is inputted from the RAM2 (108) to the sub-encoding processing unit 103 via the system bus 100. The processed image $V'_t$ to be encoded which is received from the image input DMAC3 (304) is encoded by the encoding unit 305 using the reference image determined and input as described above. Encoded data of the encoded processed image $V'_t$ is stored in the RAM1 (107) via an image output DMAC3 (307). Further, the encoding unit 305 outputs an image acquired by locally decoding the non-base view from a reference image output DMAC2 (306) to the RAM2 (108) and stores the output image as the reference image in the RAM2 (108).

The following is an additional description of the case where the base view is determined as the reference image in step S704. In this case, the processed image $V'_t$ is an image acquired by performing the image processing on the main image $V_t$. Therefore, there is no temporal difference between the processed image $V'_t$ and the main image $V_t$, and no motion component exists within the image. Thus, the motion vector can be set to 0, and the processing and memory band required for motion search can be reduced.

Further, an arrow 308 extends from the prediction determination unit 302 to the encoding unit 305. The arrow 308 indicates a signal line for transmitting information about how the reference image was selected with regard to each encoding processing area. The information about the selection of the reference image is transmitted in advance from the prediction determination unit 302 to the encoding unit 305 so that the processing to be performed by the encoding unit 305 in the case where the base view is determined as the reference image can be reduced whereby the power consumption can be reduced. Specifically, in the case where the main image of the same time (base view image) as the processed image is determined as the reference image of the processed image to be encoded, the encoding unit 305 according to the present exemplary embodiment does not perform motion search and outputs an encoding result with the motion vector information being 0.

According to the present exemplary embodiment, the main encoding processing unit 104 and the sub-encoding processing unit 103 are provided as separate processing units. However, a single processing unit may be used to perform main encoding processing and sub-encoding processing. In this case, the sub-encoding processing unit 103 according to the present exemplary embodiment is provided as an encoding processing unit, and the main encoding processing unit 104 is omitted. Then, in a case where the encoding processing unit is used as the main encoding processing unit 104, the prediction determination unit 302 continuously designates the base view as the reference image so that the encoding of the main image is realized.

Further, according to the present exemplary embodiment, the main image is encoded as the base view and the processed image is encoded as the non-base view. However, it is also possible to encode the processed image as the base view and the main image as the non-base view. In this case, the processed image is encoded by the main encoding processing unit 104 and the main image is encoded by the sub-encoding processing unit 103 to realize the encoding.

As described above, the image processing apparatus according to the present exemplary embodiment determines the reference image for encoding based on the parameter relating to the image processing at the time of encoding the processed image generated by the image processing on the input image (main image). In this way, the amount of processing can be reduced compared to the case where both the temporally-previous or subsequent processed image and the main image of the processed image are read and encoded. Further, the memory band required for the encoding can also be reduced. Furthermore, since the amount of processing is reduced, the power consumption is also reduced.

A second exemplary embodiment is described below, with mainly different points from the first exemplary embodiment. According to the present exemplary embodiment, the defog/dehaze processing is performed as first image processing on a main image to generate a processed image 1, and tone correction processing is performed as second image processing on the processed image 1 to generate a processed image 2. Then, the main image and the processed images 1 and 2 are encoded.

Figure 8:
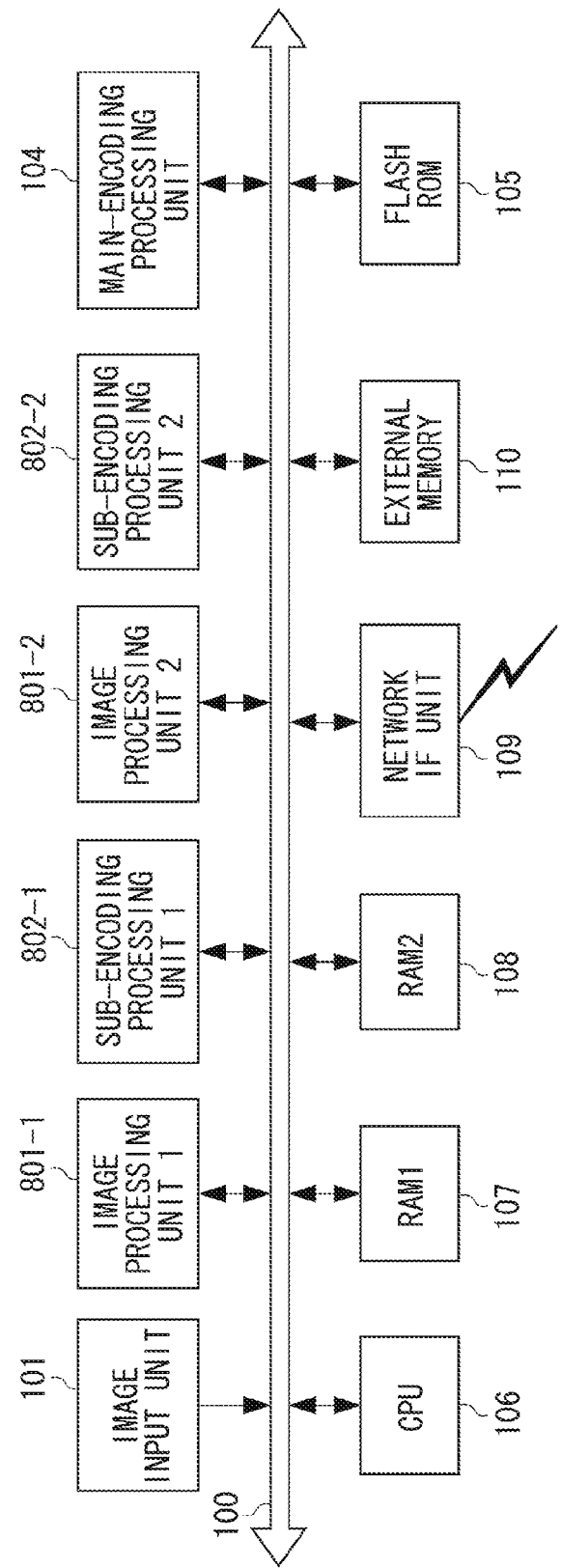
FIG. 8 is a block diagram illustrating a hardware configuration of an image processing apparatus according to an exemplary embodiment.

The present exemplary embodiment is described in detail with reference to the drawings. FIG. 8 is a block diagram illustrating a hardware configuration of an image processing apparatus according to the present exemplary embodiment. FIG. 8 is different from FIG. 1, which illustrates the hardware configuration according to the first exemplary embodiment, in that the image processing unit and the sub-encoding processing unit are changed to two image processing units 801-1 and 801-2 and the sub-encoding processing units 802-1 and 802-2, respectively. Further, while the path is set between the image processing unit and the sub-encoding processing unit to directly pass the intermediate information (parameter relating to image processing) in FIG. 1, such a direct path does not exist in the present exemplary embodiment, and the intermediate information is passed via the RAM1 (107). Other components are similar to those in FIG. 1.

Figure 9:
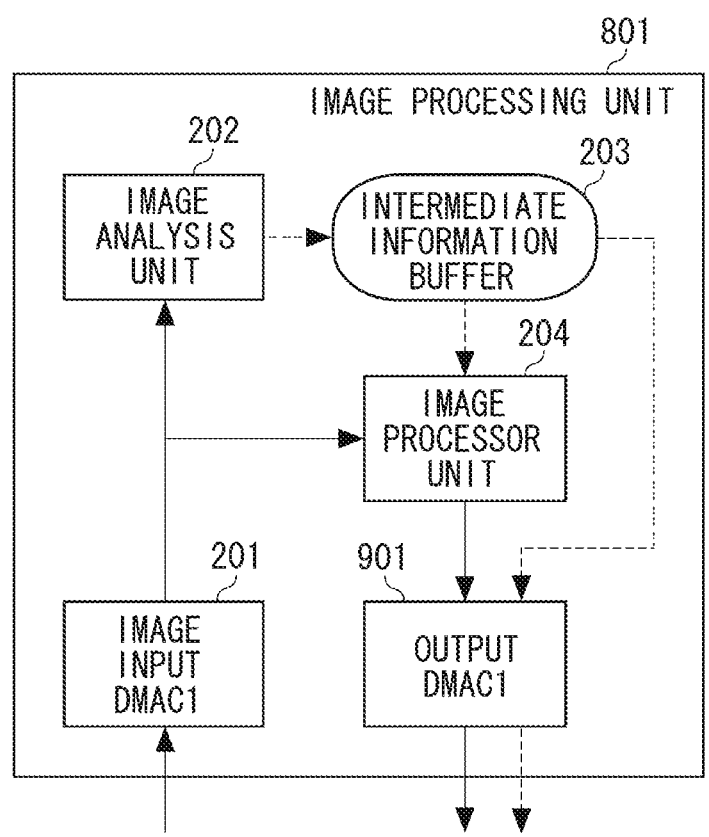
FIG. 9 illustrates a configuration of an image processing unit according to an exemplary embodiment.

FIG. 9 illustrates a configuration of an image processing unit 801 according to the present exemplary embodiment. In FIG. 9, as in FIG. 2 illustrating the image processing unit 102 according to the first exemplary embodiment, real lines indicate a flow of the main image and a processed image acquired by processing the main image, and dotted lines indicate a flow of data relating to fog density map information which is intermediate information described below. FIG. 9 is different from FIG. 2, which illustrates the image processing unit 102 according to the first exemplary embodiment, in that the encoding unit IF 206, which exists in FIG. 2, is omitted and the intermediate information is to be transferred to the RAM1 (107) via the output DMAC1 (901) and shared by the sub-encoding processing unit 802 on the RAM1 (107). The flow of the data as the intermediate information is specified by the dotted lines in FIG. 9 as described above.

Figure 10:
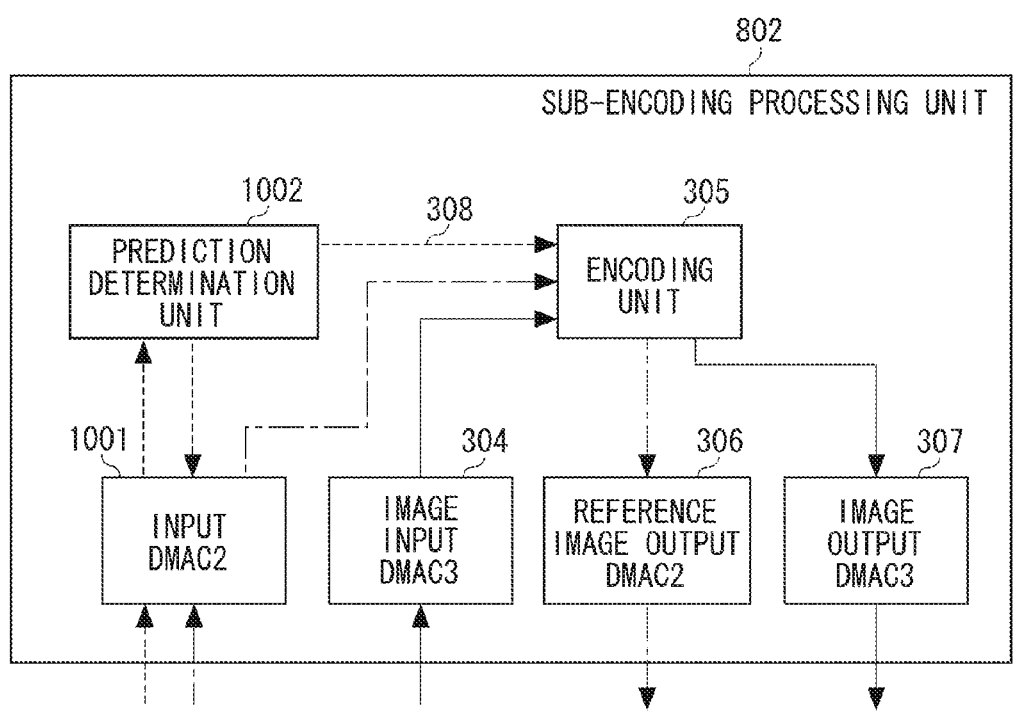
FIG. 10 illustrates a configuration of a sub-encoding processing unit according to an exemplary embodiment.

FIG. 10 illustrates a sub-encoding processing unit 802 according to the present exemplary embodiment. FIG. 10 is different from FIG. 3, which illustrates the sub-encoding processing unit 103 according to the first exemplary embodiment, in that the image processing unit IF 303, which exists in FIG. 3, is omitted and the intermediate information is to be loaded from the RAM1 (107) via an input DMAC2 (1001) and transmitted to a prediction determination unit 1002. A flow of the intermediate information is specified by dotted lines in FIG. 10.

According to the present exemplary embodiment, the defog/dehaze processing is executed in the image processing unit 1 (801-1), and the tone correction processing is executed in the image processing unit 2 (801-2). Further, the sub-encoding processing unit 1 (802-1) encodes the processed image 1 on which the defog/dehaze processing has been executed, and the sub-encoding processing unit 2 (802-2) encodes the processed image 2 on which the tone correction processing has been executed. The defog/dehaze processing and the tone correction processing are performed practically simultaneously and in parallel within the system for each 1-frame of the main image.

Since the encoding processing corresponding to the defog/dehaze processing is already described in the first exemplary embodiment, the encoding processing corresponding to the tone correction processing will be described in the present exemplary embodiment.

A relationship between details of the image processing and the intermediate information used in the image processing will be described. According to the present exemplary embodiment, the intermediate information relating to the tone correction processing is a value of a low-frequency component of an input image (main image).

The image processing unit 2 (801-2) according to the present exemplary embodiment corrects the image based on the ambient luminance of a target pixel. As to the ambient luminance, a low-frequency component of the image with the target pixel being the center is used as an estimated value. The correction processing can be performed based on the following equation (1):

$$Y'(x, y) = Avg\left[\frac{Y(x, y)^{\gamma_0}}{\{F_n(x, y) + Y(x, y)\}^{\gamma_1}}\right]. \tag{1}$$

In the equation (1), $\gamma_0$ and $\gamma_1$ are used as parameters. An operator Avg in the equation (1) indicates an operation to average results of extraction and processing of low-frequency components based on multiple scales. The following description focuses on the inside of Avg[ ] in the equation (1).

Fn(x,y)*Y(x,y) in the denominator of the formula in Avg[ ] is the above-described low-frequency component of the image with the target pixel being the center. In the formula in Avg[ ], the pixel value of the target pixel in the numerator is raised to the power of $\gamma_0$. Further, the low-frequency component in the denominator is raised to the power of $\gamma_1$. This equation is rewritten to read as:

$$\frac{Y(x, y)^{\gamma_0}}{\{F_n(x, y) + Y(x, y)\}^{\gamma_1}} = Y(x, y)^{\gamma_0} \times \{F_n(x, y) * Y(x, y)\}^{-\gamma_1}. \tag{2}$$

Description of $$Y(x,y)^{\gamma 0} \quad (3)$$

is omitted because this is the processing that is well known as γ-correction. If 1.0 is given to $\gamma_0$, $$Y(x,y)^{1.0} \times \{F_n(x,y) * Y(x,y)\}^{\gamma i} = Y(x,y) \times \{F_n(x,y) * Y(x,y)\}^{-\gamma 1} \quad (4).$$

At this time, $$\{F_n(x,y) * Y(x,y)\}^{-\gamma 1} \quad (5)$$

can be interpreted as a gain rate with respect to the target pixel Y(x,y).

If a value is given to the parameter $\gamma_1$ such that $-1<\gamma_1<0$, a γ curve that is convex up is obtained, where the low-frequency component value is measured along the horizontal axis and the gain rate is measured along the vertical axis. Thus, it can be understood that the gain rate increases at smaller low-frequency component values and decreases at larger low-frequency component values.

Accordingly, it can be understood that whether the main image is to be corrected significantly (whether the gain rate is high) can be determined from the low-frequency component value and the processing parameter. If $\gamma_1$ is any other value, the determination can be performed accordingly.

The foregoing tone correction processing is performed as the image processing by the image processing unit 2 (801-2). The operations of the image processing unit 2 are described with reference to FIG. 9. The image analysis unit 202 illustrated in FIG. 9 calculates the scale of the low-frequency component corresponding to each pixel of the main image input via the image input DMAC1 (201) and writes calculation results in the form of a low-frequency component image in the intermediate information buffer 203. The image processor unit 204 performs the tone correction processing on the main image input from the image input DMAC1 (201) by referring to the low-frequency image stored as intermediate information in the intermediate information buffer 203.

The processed image 2 having being subjected to the tone correction processing in the image processor unit 204 is outputted from the output DMAC1 (901) to the RAM1 (107). Further, when the series of image processing is completed, the low-frequency image stored as the intermediate information in the intermediate information buffer 203 is also output to the RAM1 (107) via the output DMAC1 (901).

The operations of the sub-encoding processing unit 802-2 are described with reference to FIG. 10. In FIG. 10, as in FIG. 3 illustrating the sub-encoding processing unit 103 according to the first exemplary embodiment, dotted lines indicate a flow of data relating to intermediate information, and dashed-dotted lines indicate a flow of data relating to the reference image. Further, real lines indicate a flow of the processed image V'$_t$ and the encoded processed image V'$_t$.

In FIG. 10, the sub-encoding processing unit 802-2 acquires the low-frequency image as intermediate information from the RAM1 (107) via the input DMAC2 (1001) and inputs the acquired low-frequency image to the prediction determination unit 1002. Then, the image input DMAC3 (304) receives the data of the processed image 2 to be encoded from the RAM1 (107) via the system bus 100. Further, the prediction determination unit 302 of the sub-encoding processing unit 802-2 determines, using the low-frequency image information input in advance, whether the area to be encoded should be encoded by reference to the base view image of the same time or by reference to the previous or subsequent non-base view.

The operations of the prediction determination unit 302 according to the second exemplary embodiment are described with reference to FIG. 7. According to the present exemplary embodiment, the image processing to be executed is the tone correction, and the degree of the correction can be estimated from the parameter $\gamma_1$ and the low-frequency component value as described above. If a value is given such that $-1<\gamma_1<0$, for example, a value that is one third the maximum possible value of the low-frequency component can be set as the threshold value. It is to be noted that an arbitrary value can be set as the threshold value.

In a case where the value of the low-frequency component of the main image is equal to or larger than the threshold value, the prediction determination unit 1002 predicts that the amount of correction of the processed image corresponding to the main image is small (YES in step S702), and the base view of the same time is determined as the reference image (step S704). On the other hand, in a case where the value of the low-frequency component of the main image is smaller than the threshold value, the prediction determination unit 1002 predicts that the amount of correction of the processed image corresponding to the main image is large (NO in step S702), and the non-base view image which is temporally previous or subsequent to the processed image is determined as the reference image (step S703).

Specifically, the prediction determination unit 1002 according to the present exemplary embodiment determines the reference image for encoding each area of the processed image based on the value of the low-frequency component of each area of the input image (processed image 1) corresponding to the processed image. According to the present exemplary embodiment, the defog/dehaze processing is performed and then the tone correction processing is performed. However, this is not a limiting example. For example, only the tone correction processing may be performed without performing the defog/dehaze processing.

In general, the encoding is performed on each macroblock unit such as 16×16 pixels. The prediction determination unit 1002 according to the present exemplary embodiment determines the reference image for each macro block unit. Since the low-frequency component gradually changes, the prediction determination unit 1002 uses an average value, a median value, a mode value, and the like of the low-frequency components in each pixel within the macroblock in the determination of the degree of correction. This, however, is not a limiting configuration, and the reference image may be determined for each pixel unit or a larger range than the macroblock.

The foregoing determination of the reference image for each area is realized in such a manner that the prediction determination unit 1002 issues an instruction, for example, to set an address corresponding to the reference to the input DMAC2 (1001). Data for reference is inputted from the RAM2 (108) to the sub-encoding processing unit 802 via the system bus 100. The processed image 2 to be encoded which is received from the image input DMAC3 (304) is encoded by the encoding unit 305 using the reference image determined and input as described above. Encoded data of the encoded processed image 2 is transferred to the RAM1 (107) via the image output DMAC3 (307). Further, the encoding unit 305 outputs an image acquired by locally decoding the non-base view from the reference image output DMAC2 (306) to the RAM2 (108) and stores the output image as the reference image in the RAM2 (108).

In this way, reference images can be determined for a plurality of processed images using intermediate information (parameter relating to image processing) corresponding to the respective types of processing, and the encoding of images can be performed sequentially.

According to the present exemplary embodiment, the main encoding processing unit and the sub-encoding processing units 1 and 2 are provided as separate processing units. However, a single processing unit may be used to perform the main encoding processing, the sub-encoding processing 1, and the sub-encoding processing 2. In this case, the sub-encoding processing unit 1 (802-1) according to the present exemplary embodiment is provided as an encoding processing unit, and the main encoding processing unit 104 and the sub-encoding processing unit 2 (802-2) are omitted. Then, in a case where the encoding processing unit is used as the main encoding processing unit 104, the prediction determination unit 302 continuously designates the base view as the reference image so that the encoding of the main image is realized.

Further, according to the present exemplary embodiment, two different types of image processing are executed as the image processing. However, there may be a case where the same type of image processing is performed on the main image with different intensities to generate a plurality of processed images. In such a case, for example, the image processing of the image processing unit 801-1 is continuously applied multiple times to the main image of the same time, and a plurality of generated processed images and the intermediate information are allocated to the sub-encoding processing units 802-1 and 802-2 and encoded whereby a similar result can be obtained.

In the way described above, images to be referred to can be determined in advance at the time of encoding processed images by use of the sub-encoding units, so that the memory band required for encoding the processed images can be reduced. Further, since the memory band is reduced, the power consumption can also be reduced.

According to the foregoing exemplary embodiment, an image having being subjected to the defog/dehaze processing is used as the sub-image, it is also possible to use an image having being subjected to any other image processing as the sub-image. For example, an image having being subjected to noise reduction processing that is different from the defog/dehaze processing or an image having being subjected to sharpening processing may be used as the sub-image. Further, an image having being subjected to multiple types of image processing may be used as the sub-image. As a yet further example, an image acquired by performing the noise reduction processing and the tone correction processing on a captured image may be used as the sub-image.

Aspects of the present invention can also be realized by a process in which a program for realizing one or more functions of the foregoing exemplary embodiments is supplied to a system or apparatus via a network or storage medium and one or more processors in a computer of the system or apparatus read and execute the program. Further, aspects of the present invention can also be realized by a circuit (e.g., application specific integrated circuit (ASIC)) configured to realize one or more functions.

A configuration according to an exemplary embodiment of the present invention can reduce the amount of processing to be performed in encoding of an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-181343, filed Sep. 5, 2014, which is hereby incorporated by reference herein in its entirety.

What is claimed is:

1. An image processing apparatus comprising:
   circuitry configured to:
   generate a plurality of processed images by performing image processing on at least one of a plurality of input images, the image processing being out of image encoding processing;
   determine, as a reference image for encoding a processed image generated by the image processing on the input image, whether the input image corresponding to the processed image generated by the image processing being out of image encoding processing is to be used or another processed image generated by the image processing being out of image encoding processing is to be used, based on a parameter obtained from the image processing being out of image encoding processing; and
   encode the processed image by referring to a reference image according to a determination.

2. The image processing apparatus according to claim 1, executes, as the image processing, noise reduction processing commensurate with a noise intensity of each area of the input image, and
   wherein the reference image is determined using information about the noise intensity of each area of the input image corresponding to the processed image as the parameter relating to the image processing.

3. The image processing apparatus according to claim 2, wherein the another processed image is determined as a reference image for encoding, among areas of the processed image, an area of which noise intensity of the corresponding input image is equal to or higher than a threshold value, and wherein the input image is determined as a reference image for encoding, among the areas of the processed image, an area of which noise intensity of the corresponding input image is lower than the threshold value.

4. The image processing apparatus according to claim 1, executes, as the image processing, tone correction processing commensurate with a value of a low-frequency component of each area of the input image, and wherein a reference image is determined for encoding each area of the processed image based on the value of the low-frequency component of each area of the input image corresponding to the processed image.

5. The image processing apparatus according to claim 1, wherein in a case where the another processed image is determined as the reference image for encoding the processed image, encoding the processed image to be encoded by referring to at least one of a processed image which is temporally previous to the processed image to be encoded and a processed image which is temporally subsequent to the processed image to be encoded.

6. The image processing apparatus according to claim 1, wherein whether the input image is to be used or the processed image is to be used as a reference image is determined for encoding a divided area based on at least one of an average value, a median value, and a mode value of the parameter of each of a plurality of pixels within the divided area included in the processed image.

7. The image processing apparatus according to claim 1, wherein encoding the input image as a main image in multiview coding and encoding the processed image as a sub-image in multiview coding.

8. An image processing method comprising:

generating a plurality of processed images by image processing on at least one of a plurality of input images, the image processing being out of image encoding processing;

determining, as a reference image for encoding a processed image generated by the image processing on the input image, whether the input image corresponding to the processed image generated by the image processing being out of image encoding processing is to be used or another processed image generated by the image processing being out image encoding processing is to be used, based on a parameter obtained from the image processing being out of image encoding processing; and encoding the processed image by referring to a reference image according to a determination by the determining.

9. The image processing method according to claim 8, wherein noise reduction processing commensurate with a noise intensity of each area of the input image is executed as the image processing, and wherein the reference image is determined by using information about the noise intensity of each area of the input image corresponding to the processed image as the parameter relating to the image processing.

10. The image processing method according to claim 9, wherein the another processed image is determined as a reference image for encoding, among areas of the processed image, an area of which noise intensity of the corresponding input image is equal to or higher than a threshold value, and wherein the input image is determined as a reference image for encoding, among the areas of the processed image, an area of which noise intensity of the corresponding input image is lower than the threshold value.

11. A non-transitory computer-readable storage medium storing a program for causing a computer to execute a method comprising:

generating a plurality of processed images by image processing on at least one of a plurality of input images, the image processing being out of image encoding processing;

determining, as a reference image for encoding a processed image generated by the image processing on the input image, whether the input image corresponding to the processed image generated by the image processing being out of image encoding processing is to be used or another processed image generated by the image processing being out of image encoding processing is to be used, based on a parameter obtained from the image processing being out of image encoding processing; and encoding the processed image by referring to a reference image according to a determination by the determining.

* * * * *